(12) United States Patent
Choi et al.

(10) Patent No.: US 7,250,233 B2
(45) Date of Patent: Jul. 31, 2007

(54) LITHIUM-SULFUR BATTERIES

(75) Inventors: Soo Seok Choi, Cheonan (KR);
Yunsuk Choi, Cheonan (KR); Yongju Jung, Cheonan (KR); Jaewoan Lee, Cheonan (KR); Duck Chul Hwang, Cheonan (KR); Joo Soak Kim, Cheonan (KR); Zin Park, Cheonan (KR); Seok Kim, Cheonan (KR); Ji Sung Han, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 65 days.

(21) Appl. No.: 10/072,907

(22) Filed: Feb. 12, 2002

(65) Prior Publication Data

US 2002/0192557 A1    Dec. 19, 2002

(30) Foreign Application Priority Data

Jun. 1, 2001  (KR) ............................... 2001-30878

(51) Int. Cl.
*H01M 4/58* (2006.01)

(52) U.S. Cl. ........................... 429/231.9; 429/231.95; 429/218.1; 429/232; 429/212

(58) Field of Classification Search ............. 429/218.1, 429/231.95, 231.9, 232, 209, 233, 247, 241, 429/212
See application file for complete search history.

(56) References Cited

U.S. PATENT DOCUMENTS

| | | | |
|---|---|---|---|
| 3,532,543 A * | 10/1970 | Vladimir et al. ............. | 429/333 |
| 3,716,409 A * | 2/1973 | Cairns et al. ................ | 429/103 |
| 4,833,048 A | 5/1989 | Dejonghe et al. | |
| 4,881,026 A * | 11/1989 | Ishida et al. ................ | 324/71.1 |
| 4,917,974 A | 4/1990 | De Jonghe et al. | |
| 5,162,175 A | 11/1992 | Visco et al. | |
| 5,441,831 A | 8/1995 | Okamoto et al. | |
| 5,460,905 A | 10/1995 | Skotheim | |
| 5,523,179 A * | 6/1996 | Chu ........................... | 429/104 |
| 5,601,947 A | 2/1997 | Skotheim et al. | |
| 5,609,720 A | 3/1997 | Lenz et al. | |
| 5,814,420 A | 9/1998 | Chu | |
| 5,919,587 A | 7/1999 | Mukherjee et al. | |
| 6,030,720 A | 2/2000 | Chu et al. | |
| 6,652,440 B1 * | 11/2003 | Kovalev et al. ............. | 525/279 |
| 2003/0003360 A1 * | 1/2003 | Gorkovenko et al. ....... | 429/213 |

FOREIGN PATENT DOCUMENTS

| | | | |
|---|---|---|---|
| JP | 47-28431 | * | 11/1972 |
| JP | 09-147868 | | 6/1997 |
| WO | WO 99/33125 | | 7/1999 |
| WO | WO 99/33127 | | 7/1999 |
| WO | WO 99/33131 | | 7/1999 |

OTHER PUBLICATIONS

Translation of Japanese publication JP 47-028431 (English Language).*

Levillain, E., et al. On the understanding of the reduction of sulfur ($S_8$) in dimethylformamide (DMF),—Journal of Electroanalytical Chemistry 420, 1997, pp. 167-177, May 1996.

Levillain, E., et al., "Polysulfides in dimethylformamide: only the redox couples $S^{\cdot}_n/S^{2-}_n$ are involved", Journal of Electroanalytical Chemistry 440, 1997, pp. 243-250, Jul. 1997.

Oyama, N., et al., "Dimercaptan-polyaniline composite electrodes for lithium batteries with high energy density", Nature International Weekly Journal of Science, vol. 373, No. 6515, Feb. 1995, pp. 598-600.

* cited by examiner

*Primary Examiner*—Raymond Alejandro
(74) *Attorney, Agent, or Firm*—Stein, McEwen & Bui, LLP

(57) ABSTRACT

A lithium-sulfur battery having a positive electrode including a positive active material including an active sulfur, where the positive electrode comprises an electron-conductive path and an ion-conductive path, and includes active pores of the average size of up to 20 μm having both electron-conductive and ion-conductive properties, and are filled with the active sulfur during an electrochemical reaction of the battery.

28 Claims, 7 Drawing Sheets

Fig. 1

(PRIOR ART)

LITHIUM-SULFUR BATTERIES

CROSS REFERENCE TO RELATED APPLICATION

This application is based on Korean Patent Application No. 2001-30878 filed in the Korean Industrial Property Office on Jun. 1, 2001, the content of which is incorporated herein by reference.

BACKGROUND OF THE INVENTION

1. Field of the Invention

The present invention relates to lithium-sulfur batteries, and more specifically, to lithium-sulfur batteries with good cycle life characteristics.

2. Description of the Related Art

The remarkable development of portable electronic devices has led to an increase in the demand for secondary batteries. Particularly, the secondary batteries are required to have a high energy density in relation with trends for more compact and lighter portable electronic equipment. In addition, the secondary batteries are required to be cheaper, safer, and more environmentally friendly.

The active material used in lithium-sulfur batteries is a cheap and environmentally friendly material. Further, with respect to energy density, since the energy density of a lithium-sulfur battery is anticipated to be high (i.e., that of the lithium of the negative electrode is 3,830 mAh/g and that of the sulfur of the positive electrode is 1,675 mAh/g), lithium-sulfur batteries are an attractive candidate to satisfy the above-mentioned requirements.

A conventional lithium-sulfur secondary battery uses a sulfur-based compound with a sulfur-sulfur bond as a positive active material, and a lithium metal or a carbon-based compound as a negative active material. Upon discharge (electrochemical reduction), a sulfur-sulfur bond is broken, resulting in a decrease in the oxidation number of S. Upon recharging (electrochemical oxidation), a sulfur-sulfur bond is formed, leading to an increase in the oxidation number of S. Therefore, the electrochemical energy can be stored and generated using the reduction-oxidation reactions. The above-mentioned sulfur-based compound is often referred to as an "active sulfur."

The active sulfur has a reductive state that is not simple, and it coexists with various chemical species, successively (see E. Levillain et al., J. Electroanal. Chem. 420 (1997) 167; and E. Levillain et al., J. Electroanal. Chem. 440 (1997) 243). Overall, the reaction occurring in batteries of active sulfur is described in the following Formula 1:

$$xLi + S \leftrightarrows Li_xS \quad \text{(Formula 1)}$$

That is, active sulfur in lithium-sulfur batteries reacts with the lithium metal, resulting in a reduction to lithium sulfide or lithium polysulfide. The compound of the theoretical final oxidation state is $S_8$, while the compound of the final reductive state is $Li_2S$. When $S_8$ is completely reduced to $Li_2S$ (100% utilization), it has a theoretical capacity of 1,675 mAh/g. Thus, capacity is higher than for any other chemical species.

Figure 1:
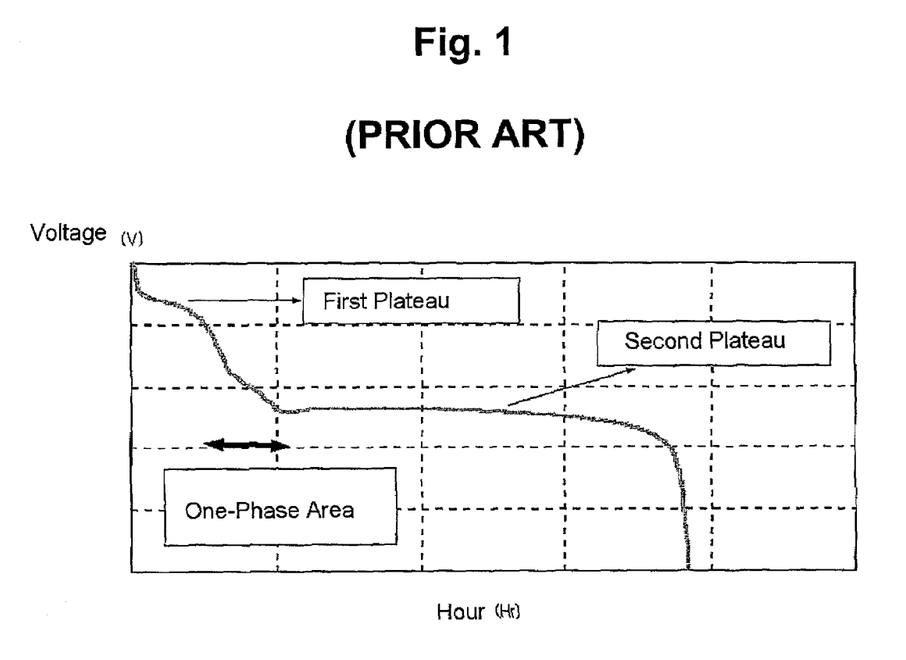
FIG. 1 is a graph showing a general discharge curve of the conventional lithium-sulfur battery cell.

Contemplated battery designs include those in which (a) all of the active sulfur dissolves in the electrolyte (one-phase positive electrode), and (b) the active sulfur is present both in a solid phase (sometimes precipitated) and in a liquid phase in the electrolyte, an example of which is disclosed in U.S. Pat. No. 6,030,720. However, regardless of which design is adopted, with cycles of charging-discharging, the active sulfur of the lithium-sulfur battery may exist in either an all-liquid phase or a solid-liquid mixed phase as shown in FIG. 1. Referring to FIG. 1, only the liquid phase exists in the decreasing curve of the discharge, while both liquid and solid phases coexist in the first and second plateau parts.

The lithium-sulfur battery is different from other types of batteries in that the solid and the liquid phases may simultaneously coexist as the positive active materials. Accordingly, in the lithium-sulfur battery, the active material may be attached to the positive electrode and dissolved in the electrolyte.

As described above, during a charging-discharging cycle, the active material is not maintained as an all-solid phase, but coexists with a liquid phase. Therefore, the active material can be electrochemically inactive (i.e., the active material may not stay within the positive electrode), but it can be detached from the positive electrode and become unavailable for further electrochemical redox reaction. Accordingly, although lithium-sulfur batteries have a high theoretical capacity, the performance thereof is not satisfactory. In addition, on the condition of the continued reduction of the lithium polysulfide, the sulfur is irreversibly precipitated on the surface of the conductive network and it is hard to oxidize again, with the difficulty greatly depending upon the composition of the electrolyte.

In order to avoid the problems and provide lithium-sulfur batteries with excellent performance, positive active materials have been proposed as follows: an organosulfur compound such as those disclosed in U.S. Pat. Nos. 4,833,048 and 4,917,974 and U.S. Pat. No. 5,162,175; DMcT-Pan (2,5-dimercapto-1,3,4-thiadiazol and polyaniline) as disclosed in Oyama et al., Nature, 373, 598-600, 1995; and a carbon-sulfur compound as disclosed in U.S. Pat. Nos. 5,441,831, 5,460,905, 5,601,947, and 5,609,720. However, the organosulfur has a low theoretical capacity and a slow reaction rate at room temperature. Further, the carbon-sulfur compound also has problems in that the theoretical capacity is low and it is not easy to reproduce the material with an identical molecular structure.

Accordingly, attempts have been made to utilize elemental sulfur ($S_8$) as a positive active material. Since elemental sulfur has the highest theoretical capacity and is in the form of powder, an electrode can be prepared to have a high active material density per unit volume and a high capacity density, resulting in providing a positive electrode with a high capacity. In U.S. Pat. No. 5,523,179, an elemental sulfur rechargeable at room temperature is utilized in the battery system. As disclosed in this patent, the theoretical final oxidation state of active sulfur is defined as inorganic sulfur ($S_8$).

Even when using elemental sulfur, the problems of the coexistence of solid and liquid phases of the sulfur occur. In order to overcome the problems, it has been suggested that sulfur-absorbing additives be added to a positive active material slurry to delay the detachment of the sulfur. As the sulfur-absorbing additives for this purpose, JP Laid-Open Publication No. 09-147868 discloses an active carbon fiber. U.S. Pat. No. 5,919,587 discloses techniques whereby a positive active material is embedded among transient metal chalcogenides having a highly porous, fibrous and ultra fine sponge-like structure, or that the positive active material is encapsulated therewith. Further, PCT Publication No. WO 99/33131 discloses that particulates such as carbon, silica, and aluminum oxide having a potent absorbency toward polysulfide are added. PCT Publication No. WO 99/33125 discloses that the positive electrode is encapsulated within a separator made of a microporous pseudo-boehmite layer, so as to inhibit the diffusion of soluble polysulfide. PCT Publication No. WO 99/33127 discloses that polysulfide anions are kept around a cationic polymer with a quaternary ammonium and an anionic polymer including a salt group. However, as a result of incorporating the additives to enhance the positive electrode active mass, the energy density is reduced.

SUMMARY OF THE INVENTION

To overcome the above and other problems, it is an object of the present invention to provide a lithium-sulfur battery having good cycle life characteristics by facilitating a continuous availability of positive active materials for the electrochemical redox reaction.

It is a further object of the present invention to provide a lithium-sulfur battery including a positive electrode with a broader reactive surface area.

Additional objects and advantages of the invention will be set forth in part in the description which follows and, in part, will be obvious from the description, or may be learned by practice of the invention.

In order to realize the above and other objects, a lithium-sulfur battery according to an embodiment of the present invention includes a positive electrode including a sulfur-based compound as a positive active material, wherein the positive electrode includes an electron-conductive path and an ion-conductive path and pores of an average size of up to 20 μm having both electron-conductive and ion-conductive properties, where the pores are filled with the active sulfur during an electrochemical reaction of the battery, a negative electrode comprising a negative active material selected from the group consisting of a lithium metal, a lithium-containing alloy, materials which can reversibly intercalate/deintercalate lithium ions, or materials which can reversibly form a chemical compound with lithium, a separator interposed between the positive and negative electrodes, and an ion-conductive electrolyte.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

In lithium-sulfur batteries, since sulfur is a nonconductor, it is required to add an ionic conductor and an electronic conductor in the positive electrode in order to activate the electron movement and to construct an effective conduction network as also discussed in U.S. Pat. Nos. 5,523,179 and 5,814,420. Further, unlike a positive electrode of nickel-metal hydride batteries or lithium ion batteries, a positive electrode of lithium-sulfur batteries has disadvantages in that an electron path and an ion path thereof are deformed due to the movement of positive active material dissolved in the electrolyte. In order to solve these and other disadvantages, the present invention provides a positive electrode in which active sulfur of the positive active material is continuously available for an electrochemical redox reaction.

Figure 6:
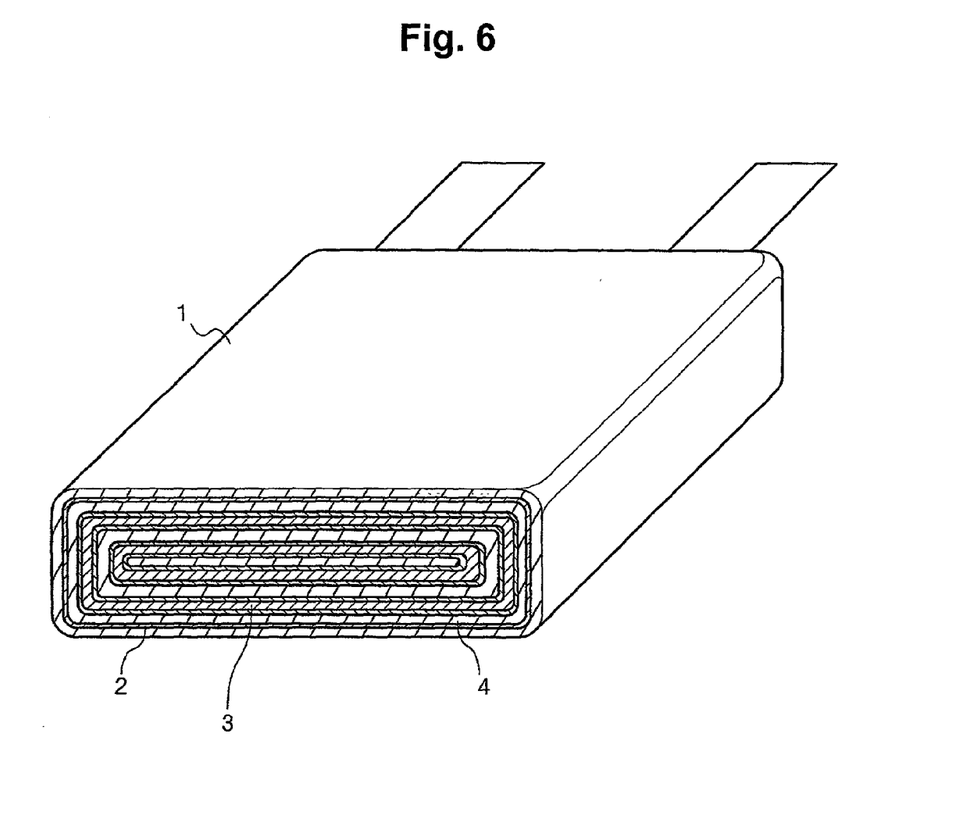
FIG. 6 is a perspective view of a cross section of a lithium sulfur battery according to an embodiment of the present invention.

As shown in FIG. 6, a lithium-sulfur battery using the active material according to an embodiment of the present invention includes a case 1 containing a positive electrode 3, a negative electrode 4, and a separator 2 interposed between the positive electrode 3 and the negative electrode 4.

According to lithium-sulfur batteries of the present invention, the positive electrode 3 comprises an electron-conductive path and an ion-conductive path, so it exhibits both electronic conductivity and ionic conductivity. Active pores, where active sulfur is filled during an electrochemical reaction of the battery, have an average size of up to 20 μm. Preferably, the average size is up to 10 μm, and mare preferably up to 5 μm. When the average size of active pores is more than 20 μm, a viscous polysulfide solution easily diffuses to an electrochemically inactive area so as to ultimately decrease the capacity of the battery. Further, the effectiveness of the electrochemical reaction is reduced due to the decrease of the reaction surface area with the ionic and electronic conductivity.

Further, in lithium-sulfur batteries, the positive electrode 3 includes a current collector and an active mass having a positive active material, a binder and a conductive agent, and the electrolyte is impregnated therein. The binder tightly binds the positive active material and the conductive agent to preserve a conductive network. Further, the elemental sulfur is reduced to polysulfide through the electrochemical reaction. Since the polysulfide exists in a solution, pores are generated on the conductive network structure. Active pores are referred to as both pores filled with a polysulfide solution, and the pores presented on the electrode. The active pores facilitate an electrochemically active site (with electronic and ionic paths coexisting) occurring for the redox reaction. Upon discharging of the battery, the active sulfur of the positive active materials may be present as either a solid phase or a liquid phase in the porous structure. Since solid-phase active sulfur is a nonconductor, the reaction will occur only at the electrochemically active site on the surface of the sulfur. Accordingly, since it is impossible with the solid-phase sulfur to increase the active site for effective reaction, the reactive surface should be increased by minimizing the size of the solid-phase active sulfur.

Therefore, the present invention uses a positive electrode 3 having very small pores. The active sulfur dissolved in the electrolyte is generally viscous. The concentration of the lithium polysulfide is preferably about 3-30M (S), and the higher the concentration of the lithium polysulfide, the higher the viscosity. The (S) is referred to as the value of concentration of the sulfur element that is calculated from all types of soluble $S_x^{2-}$ (wherein x is a positive number of 1 to 8). For example, 1M $S_6^{2-}$ has 6M of concentration of the sulfur element. Highly concentrated (more than 7 M(S)) polysulfide is required to increase the energy density in the lithium-sulfur battery. According to hydromechanics, such highly concentrated viscous material becomes slow in movement upon decreasing the pore size. Thus, upon the repeat of the redox reaction, the viscous material is difficult to diffuse out from the active site in the positive electrode 3. That is, upon reducing the size of the pores, an increase in utilization is anticipated owing to increasing the active site, thereby improving the capacity and the cycle life characteristics by decreasing the detachment of active materials.

According to an embodiment of the present invention, the method of preparing a positive electrode 3 having a reacting surface of the broad area is as follows:

A micro positive active material is used. Specifically, a positive active material, conductive agent and binder are mixed in an organic solvent to provide a positive active material slurry. Elemental sulfur ($S_8$) is preferably used as the positive active material incorporated when preparing the positive electrode 3. The elemental sulfur is reduced to polysulfide and is dissolved as a form of a polysulfide during the electrochemical redox reaction to provide the active pores as mentioned above. It is preferable that the elemental sulfur be a powder having a small size to control the pore structure of a positive electrode. The average particle size of the elemental sulfur powder is preferably up to 20 μm, more preferably up to 10 μm, and most preferably up to 5 μm.

Examples for the conductive agent include carbon black, acetylene black, ketchen black, or metal powder but are not limited thereto.

Examples of the binder include poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, copolymer of polyhexafluoropropylene and polyvinylidene fluoride (commercially available under the trade mark of "KYNAR"), poly(ethyl acrylate), polytetrafluoro ethylene, polyvinyl chloride, polyacrylonitrile, polyvinylpyridine, polystyrene, poly(butyral-co-vinyl alcohol-co-vinyl acetate), poly(methyl methacrylate-co-ethyl acrylate), poly vinyl chloride co-vinyl acetate, polyalkylene oxide, poly(1-vinylpyrrolidone-co-vinyl acetate) and cellulose acetate, etc., derivatives thereof, blends thereof, and copolymers thereof, but are not limited thereto. Among these binders, polyethylene oxide, polypyrrolidone, or polyvinylalcohol also have a role as ion-conductive agents in which ions can pass through.

The organic solvent is preferable to uniformly disperse the positive active material, binder, and conductive agent, and to be easily evaporated. Examples include acetonitrile, methanol, ethanol, tetrahydrofuran, water, and isopropyl alcohol, but are not limited thereto.

In the positive active material slurry, an amount the positive active material is 60 to 90% by weight, an amount of the binder is 5 to 20% by weight, and an amount of the conductive agent is 5 to 20% by weight.

The particle size of the elemental sulfur ($S_8$) powder can be controlled by using pulverized elemental sulfur having a desired particle size distribution, or by pulverizing the coarse elemental sulfur powder with a grinder, such as a ball mill, in the organic solvent that is used when an active material slurry is prepared. The particle size of the elemental sulfur powder is understood to be the size of the elemental sulfur powder present in the positive electrode just prior to assembling an electrode group (comprising a positive electrode 3, a negative electrode 4, and a separator 2), or the pore size after washing and removing polysulfide from the positive electrode 3 with an appropriate solvent such as dimethoxyethane in the case of disassembly of the battery in the one-phase region. The one-phase region is referred to as a region where the voltage is decreased with the passage of time. This is in contrast to multiphase regions where solid and liquid phases exist as evidenced by the first and second plateaus indicating the voltage is maintained with the passage of time as shown in FIG. 1.

The positive active material slurry prepared as above is coated on a current collector to provide the positive electrode 3.

Further, according to another embodiment of the invention, when the battery cell is fabricated by the conventional method and using the positive electrode, some (S) concentrations of the polysulfide are further added in the operation of injecting an electrolyte. The polysulfide solution is prepared by mixing a lithium-sulfur compound, such as $Li_2S$, with the elemental sulfur under an inert gas atmosphere. Examples of the organic solvent include ethylene carbonate, propylene carbonate, dioxolane, sulfolane, xylene, diglyme, tetrahydro furan, tetraglyme, sulfone, dimethyl sulfone, dialkyl carbonate, butyrolactone, N-methyl pyrrolidone, tetramethyl urea, glyme, crown ether, dimethoxy ethane, N,N-diethyl formamide, N,N-diethyl acetamide, hexamethyl phosphoamide, pyridine, dimethyl sulfoxide, N,N-dimethyl acetamide, tributyl phosphate, trimethyl phosphate, N,N,N, N-tetraethyl sulfamide, tetramethylene diamine, tetramethyl propylene diamine, pentamethylene triamine, methanol, ethylene glycol, polyethylene glycol, nitro methane, trifluoro acetic acid, trifluoro methane sulfonic acid, sulfur dioxide, boron trifluoride, and the like, and a mixture thereof, but are not limited thereto.

In addition, according to another embodiment of the present invention, a plasticizer is further added to the slurry comprising positive active materials, binder, and conductive agents so as to form the pores. Examples of the plasticizer include dibutyl phthalate, dimethyl phthalate, diethyl phthalate, trishutoxyethyl phosphate, propylene carbonate, ethylene carbonate, trimethyl trimellitata, and the like, and a mixture thereof, but are not limited thereto. The amount of the plasticizer is preferably from 5 to 80% by weight of the positive electrode. It was found that below this lower limit, the plasticizer does not work. Conversely, beyond the upper limit, when the plasticizer is removed, the density of the positive electrode will be too low to get the effective energy density.

If the plasticizer is further added to the slurry and the slurry is coated on the current collector, an additional operation should be performed to remove the plasticizer from the current collector. The method of removing the plasticizer includes impregnating the current collector with an extracting solvent selected from the group consisting of ether, diethyl ether, hexane, petroleum ether, ligroin, cyclohexane, methanol, ethanol, dichloromethane, trichloroethylene and trichloroethane and the like, and drying. The plasticizer is removed to generate additional pores on the positive electrode. Upon using the plasticizer, since the formed pores can be maintained even during the rolling press of the electrode, a thickness of the positive electrode can be decreased and so that the battery having a high energy density can be obtained.

The positive electrode having micropores can be prepared without using elemental sulfur according to a further embodiment of the invention. Specifically, a positive electrode is prepared by coating a current collector having pores with a mixture of the binder and the conductive agent, but not using the elemental sulfur. The battery cell is then fabricated with the positive electrode 3. Some (S) concentration of polysulfide solution is then added to the prepared battery cell. The polysulfide solution is injected through pores of the coated current collector to provide a positive electrode.

Examples of the solvent of the polysulfide solution include ethylene carbonate, propylene carbonate, dioxolane, sulfolane, xylene, diglyme, tetrahydrofuran, tetraglyme, sulfone, dimethyl sulfone, dialkyl carbonate, butylolactone, N-methyl pyrrolidone, tetramethyl urea, glyme, crown ether, dimethoxy ethane, N,N-diethyl formamide, N,N-diethyl acetamide, hexamethyl phosphoramide, pyridine, dimethyl sulfoxide, N,N-dimethyl acetamide, tributyl phosphate, trimethyl phosphate, N,N,N,N-tetraethyl sulfamide, tetramethylene diamine, tetramethyl propylene diamine, pentamethylene triamine, methanol, ethylene glycol, polyethylene glycol, nitro methane, trifluoro acetic acid, trifluoro methane sulfonic acid, sulfur dioxide, boron trifluoride, and the like, and a mixture thereof, but are not limited thereto.

The solvent is an ion-conductive medium capable of facilitating ionic conductivity in the battery. Thus, the solution of the polysulfide alone can act as an electrolyte. Accordingly, in the case of using the positive electrode, it is not necessary to inject an additional electrolyte. When preparing the positive electrode, the plasticizer may be further added to the mixture of the binder and the conductive agent. The plasticizer can be selected from the group consisting of tributyl phthalate, dimethyl phthalate, diethyl phthalate, trishutoxyethyl phosphate, propylene carbonate, ethylene carbonate, trimethyl trimellitata, and the like, and a mixture thereof. If it is desired to add the plasticizer, it is necessary to remove the plasticizer with the extracting solvent after obtaining the electrode. Thereby, more pores are generated on the positive electrode 3 than exist without using the plasticizer.

The mixing method is controlled such that the suitable conductive agents, such as a carbon powder and a metal powder, are selected and the inputted materials are appropriately dispersed. By selecting the suitable conductive agents and appropriately dispersing them, the pores are uniformly distributed on the positive electrode 3 so that a conductive network is uniformly formed.

The pores and conductive network can be also accomplished by using a carbon paper of a desired pore size.

According to an embodiment of the present invention, the pores are in the area where an ion path and an active sulfur site coexist. The method to measure the size of pores includes disassembling the fresh lithium-sulfur battery while in the one-phase region, extracting the positive electrode 3 with an appropriate solvent (such as dimethoxy ethane) to remove an electrolyte solvent and active sulfur, and measuring the size of pores of the positive electrode 3. Alternatively, in the case of the positive electrode 3 containing a sulfur powder, the pore size is the size of the sulfur particles present in the positive electrode 3 immediately prior to injecting the electrolyte or polysulfide solution. The pore size is preferably up to 20 μm, more preferably up to 10 μm, and most preferably up to 5 μm.

The negative electrode 4 includes a negative active material selected from a lithium metal, a lithium-containing alloy, materials which can reversibly intercalate/deintercalate lithium ions, or materials which can reversibly form a chemical compound with the lithium.

The lithium-containing alloy includes a lithium/aluminum alloy or a lithium/tin alloy, and the materials which can reversibly intercalate/deintercalate the lithium ions are carbonaceous materials. Any carbonaceous materials may be used as long as they are capable of intercalating and deintercalating lithium ions reversibly. Examples of the carbonaceous materials include crystalline carbon, amorphous carbon, or a mixture thereof. Further, the material which can form a chemical compound with lithium includes, for example, titanium nitrate.

In addition, when the battery of the present invention uses the elemental sulfur, it further includes an electrolyte. The electrolyte may be used in a form of either a liquid electrolyte or a solid electrolyte. In the case of the liquid electrolyte, the lithium-sulfur battery should further include a separator 2 between the negative and positive electrodes 4 and 3. Examples of suitable separators 2 include porous glass, plastic, ceramic, polymer, and the like.

The solid electrolyte has functions of both separating the negative and positive electrodes 4 and 3 physically and carrying the metal ions. The solid electrolyte may include any ion-conductive materials as long as it is electrochemically stable. Examples of an ion-conductive material include glass electrolyte, polymer electrolyte, ceramic electrolyte, and the like. The more preferable solid electrolyte is a mixture of polymer electrolyte, such as polyether, polyimine, polythioether, and the like, with a suitable supporting electrolyte salt. The solid electrolyte may include less than about 20% by weight of a non-aqueous organic solvent, and it may further include a suitable gelling agent to reduce the fluidity of organic solvent.

The liquid electrolyte includes a non-aqueous organic solvent and an electrolyte salt. Examples of the organic solvent include, but are not limited to, ethylene carbonate, propylene carbonate, dioxolane, sulfolane, xylene, diglyme, tetrahydro furan, tetraglyme, sulfone, dimethyl sulfone, dialkyl carbonate such as dimethyl carbonate, butyrolactone, N-methyl pyrrolidone, tetramethyl urea, glyme, crown ether, dimethoxy ethane, N,N-diethyl formamide, N,N-diethyl acetamide, hexamethyl phosphoamide, pyridine, dimethyl sulfoxide, N,N-dimethyl acetamide, tributyl phosphate, trimethyl phosphate, N,N,N,N-tetraethyl sulfamide, tetramethylene diamine, tetramethyl propylene diamine, pentamethylene triamine, methanol, ethylene glycol, polyethylene glycol, nitromethane, trifluoro acetic acid, trifluoro methane sulfonic acid, sulfur dioxide, boron trifluoride, and the like, and a mixture thereof.

Examples of the electrolyte salts include lithium trifluoromethansulfon imide, lithium triflate, lithium perdorate, lithium hexafluorophosphate, lithium borofluoride, and the like.

Hereinafter, the present invention will be explained in detail with reference to Examples. These Examples, however, should not in any sense be interpreted as limiting the scope of the present invention and equivalents thereof.

EXAMPLE 1

Sublimed sulfur was pulverized in a solution of isopropyl alcohol with a ball mill to a particle size of 5 μm. The pulverized sulfur powder was mixed with a conductive agent and a binder with the ball mill to provide a slurry in which the particles were uniformly dispersed. Carbon black and polyethylene oxide (Molecular weight: 5,000,000) were used as the conductive agent and the binder, respectively.

The sulfur, the conductive agent and the binder were mixed in the weight ratio of 60:20:20 in acetonitrile to prepare a viscous slurry. The slurry was coated on an aluminum foil using a doctor blade so that a positive electrode was obtained. The energy density of the resultant positive electrode was 1.0 mAh/cm². Using a lithium metal with a thickness of 130 μm as a counter electrode, and 1 M LiSO$_3$CF$_3$, 1,3-dioxolane/diglyme/sulfolane/dimethoxy ethane (50/20/10/20, by volume ratio) as an electrolyte, a coin-type cell was fabricated in a glove box in which moisture was controlled.

EXAMPLE 2

The positive electrode was prepared by the same procedure as described in Example 1. The energy density of the resultant positive electrode was 0.6 mAh/cm². Under an inert gas atmosphere, 6M(S) of Li$_2$S$_8$ was prepared by reacting Li$_2$S with S$_8$ in a solution of dimethoxy ethane with a ball mill to provide a polysulfide solution. Using a lithium metal with a thickness of 130 μm as a counter electrode and a polysulfide solution as a catholyte, but not using an additional electrolyte, a coin-type cell was fabricated in a glove box in which moisture was controlled.

EXAMPLE 3

A positive electrode was prepared by the same procedure as described in Example 1, except that 10% by weight of dibutyl phthalate was added to the positive active material slurry. The slurry was coated on the current collector and dried, and then the residual dibutyl phthalate was extracted with ether. The energy density of the resultant positive electrode was 0.6 mAh/cm². Under an inert gas atmosphere, 6M(S) of Li$_2$S$_8$ was prepared by reacting Li$_2$S with S$_8$ in a solution of dimethoxy ethane with a ball mill to provide a polysulfide solution. Using lithium metal with a thickness of 130 μm as a counter electrode and a polysulfide solution as a catholyte, but not using an additional electrolyte, a coin-type cell was fabricated in a glove box in which moisture was controlled.

EXAMPLE 4

A slurry was prepared by mixing dibuthyl phthalate, a conductive agent, and a binder in the weight ratio of 1:1:1. The slurry was coated on a current collector, dried, and then any residual dibutyl phthalate was removed with ether so that a positive electrode was obtained. Under an inert gas atmosphere, 6M(S) of Li$_2$S$_8$ was prepared by reacting Li$_2$S with S$_8$ in a solution of dimethoxy ethane with a ball mill to provide a polysulfide solution. Using lithium metal with a thickness of 130 μm as a counter electrode, and a polysulfide solution as a catholyte, but not using an additional electrolyte, a coin-type cell was fabricated in a glove box in which moisture was controlled.

EXAMPLE 5

Sublimed sulfur was pulverized in a solution of isopropyl alcohol with a ball mill until a particle size of 5 μm was obtained. The pulverized sulfur was mixed with a conductive agent, a binder, and a plasticizer with the ball mill to provide slurry in which the particles were uniformly dispersed. Carbon black, polyvinylidene fluoride, and dibutyl phthalate were used as the conductive agent, the binder, and the plasticizer, respectively. The sulfur, the conductive agent, the binder and the plasticizer were mixed in the weight ratio 50:20:20:10 in acetonitrile to prepare a viscous slurry. The slurry was coated on an aluminum foil using a doctor blade and dried in an oven at 85° C. for 2 hours so as to provide a positive electrode. The dried electrode was pressed and the dibutyl phthalate was extracted with ether. Further, under an inert gas atmosphere, 10M (S) of Li$_2$S$_8$ were prepared by reacting Li$_2$S with S$_8$ in a solution of dimethoxy ethane with a ball mill to provide a polysulfide solution. Using lithium metal with a thickness of 130 μm as a counter electrode, and a polysulfide solution as a catholyte but not using an additional electrolyte, a coin-typed cell was fabricated in a glove box in which moisture was controlled.

COMPARATIVE EXAMPLE 1

A positive electrode was prepared by the same procedures as described in Example 1 except that the particle size of sulfur was 30 μm. The energy density of the resultant positive electrode was 0.9 mAh/cm². Using a lithium metal with a thickness of 130 μm as a counter electrode, and 1,3-dioxolane/diglyme/sulfolane/dimethoxy ethane (50/20/10/20, by volume ratio) including 1M LiSO$_3$CF$_3$ as an electrolyte, a coin-type cell was fabricated in a glove box in which moisture was controlled.

EXAMPLE 6

A positive electrode was prepared by the same procedure as described in Comparative Example 1 except that the particle size of the sulfur was 15 μm. The energy density of the resultant positive electrode was 0.9 mAh/cm². Using a lithium metal with a thickness of 130 μm as a counter electrode, and 1,3-dioxolane/diglyme/sulfolane/dimethoxy ethane (50/20/10/20, by volume ratio) including 1M LiSO$_3$CF$_3$ as an electrolyte as an electrolyte solvent, a coin-type cell was fabricated in a glove box in which moisture was controlled.

Figure 2:
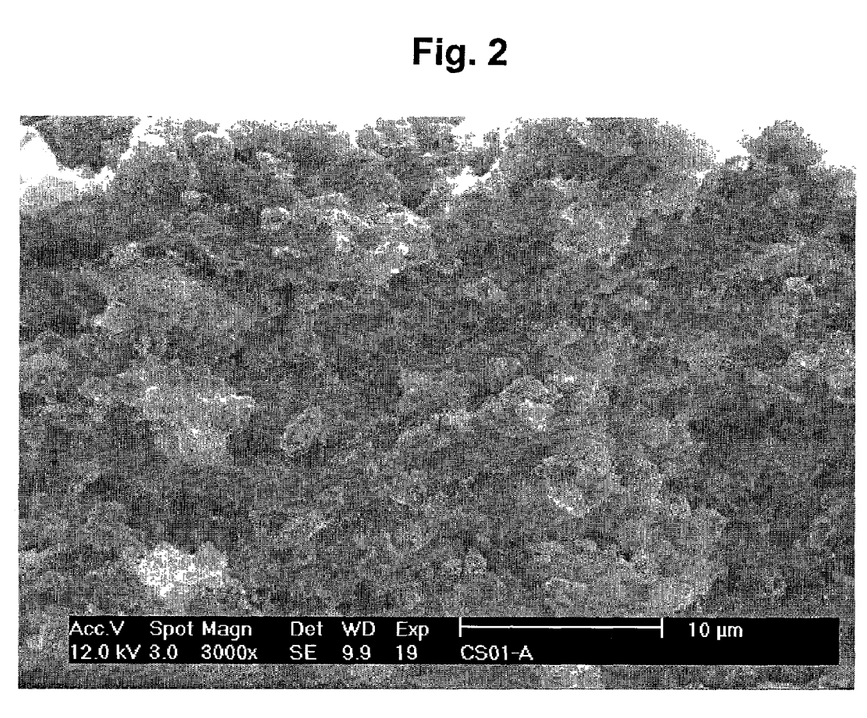
FIG. 2 is a scanning electronic microscope (SEM) view showing a surface of a positive electrode according to an embodiment of the present invention prior to fabrication of the lithium-sulfur cell.
Figure 3A:
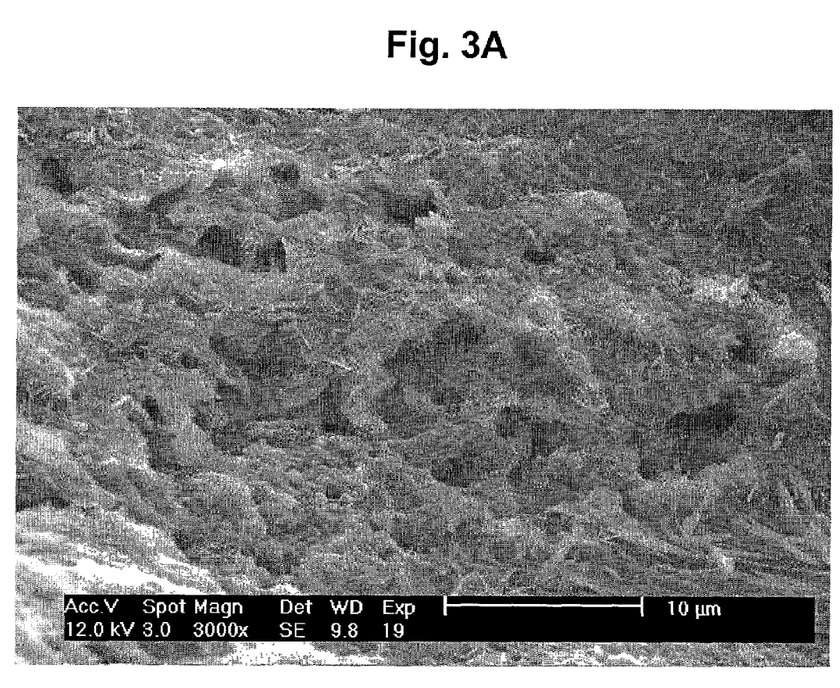
FIGS. 3A and 3B are SEM views showing surfaces of positive electrodes according to Example 3 and Comparative Example 1 after undergoing two cycles of charging-discharging.
Figure 3B:
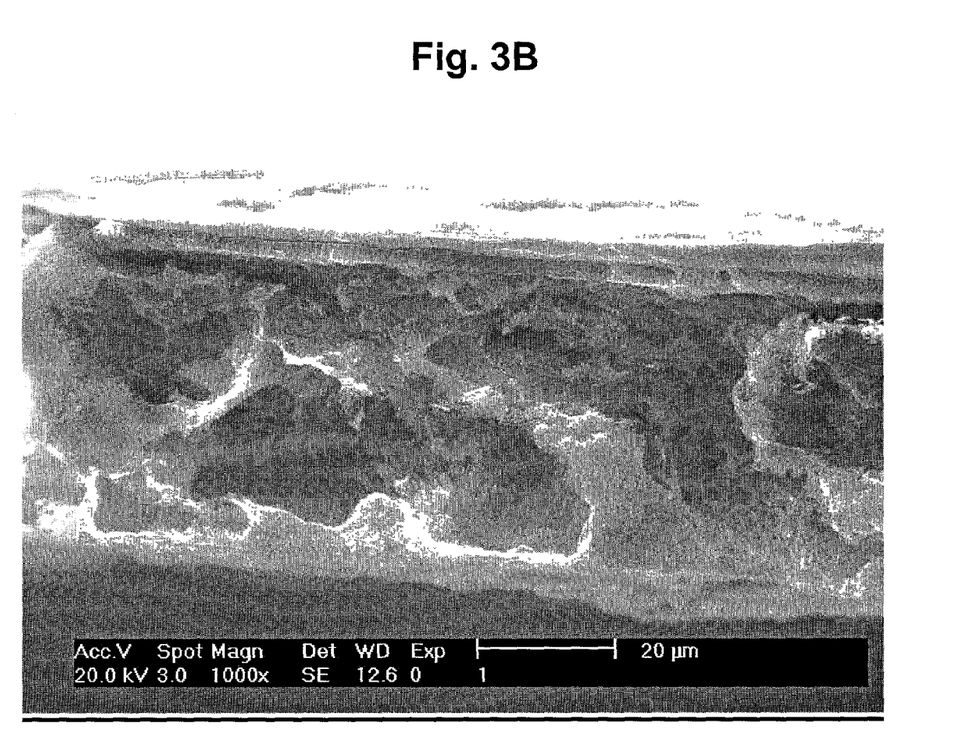

FIG. 2 shows a surface state of a positive electrode prepared prior to fabrication of the lithium-sulfur cell in Example 1. Particles of the conductive agents are shown coagulated around the sulfur. FIGS. 3A and 3B show surface states of positive electrodes which are obtained by disassembling the cells prepared according to Example 3 and Comparative Example 1, respectively, after two charging-discharging cycles and then washing the electrodes with dimethoxy ethane. In FIGS. 3A and 3B, the pores indicate the sites where the sulfur particles dissolve out As shown in FIG. 3A, when the positive electrode is prepared using the positive active material comprising sulfur, the reactive surface area grows broader so as to improve the capacities of the cells.

The cells of Examples 1 to 4, Example 6, and Comparative Example 1 were charged for 5.5 hours with a current density of 0.2 mA/cm² or to the voltage of 2.8 V and discharged with a current of 0.1 mA/cm². The capacities of the cells were measured after 1, 10, 30, and 50 cycles, and the capacity retentions are shown in Table 1 below:

TABLE 1

| Capacity retention | 1 cycle (%) | 10 cycles (%) | 30 cycles (%) | 50 cycles (%) |
|---|---|---|---|---|
| Example 1 | 100 | 80 | 75 | 70 |
| Example 2 | 100 | 80 | 75 | 55 |
| Example 3 | 100 | 85 | 70 | 65 |
| Example 4 | 100 | 90 | 70 | 60 |
| Comparative Example 1 | 100 | 60 | 50 | 30 |
| Example 6 | 100 | 75 | 68 | 55 |

As shown in Table 1, after 50 cycles, the capacities of the cells of Examples 1 to 4 were reduced by 40 to 30%, while those of Comparative Example 1 and Example 6 were reduced by 70% and 45%, respectively.

Figure 4:
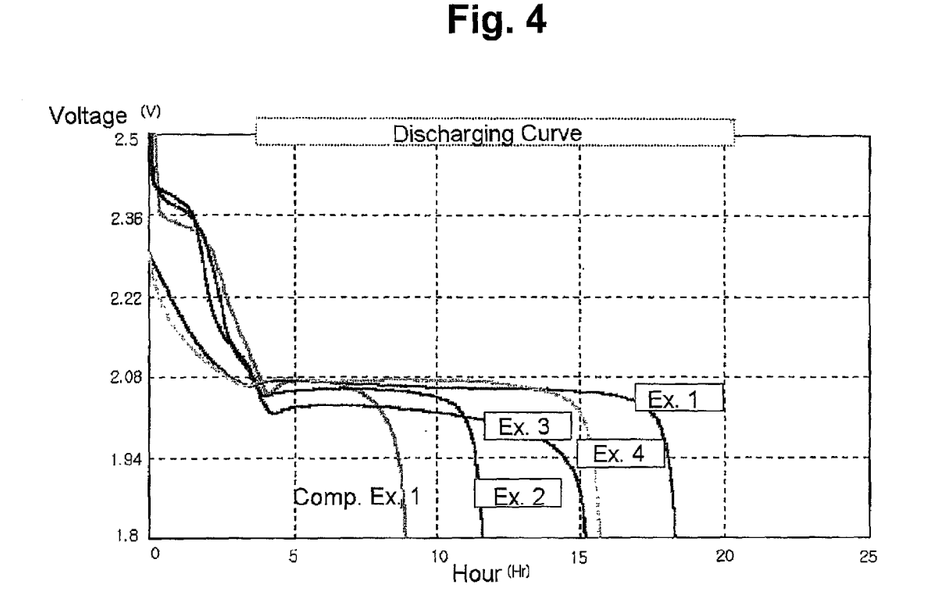
FIG. 4 is a graph showing discharge curves of the lithium-sulfur battery cells according to Examples 1-4 and Comparative Example 1.

FIG. 4 illustrates the discharge potential of cells of Examples 1 to 4 measured with the passage of time. As shown in FIG. 4, the potentials of cells of the Examples 1 to 4 are maintained at around 2V for a relatively long time, while the potential of the cell of the Comparative Example 1 is rapidly reduced within a relatively short time.

The cells of Example 5, Example 6, and Comparative Example 1 were charged to a voltage of 2.5 V with a current density of 0.2 mA/cm$^2$, and it was discharged with varying the current density of 0.1 mA/cm$^2$, 0.2 mA/cm$^2$, 0.5 mA/cm$^2$, and 1.0 mA/cm$^2$. Table 2 shows the results of the discharging capacity retentions according to the discharge current density.

TABLE 2

| Discharge current density retention | 0.1 mA/cm$^2$ (%) | 0.2 mA/cm$^2$ (%) | 0.5 mA/cm$^2$ (%) | 1.0 mA/cm$^2$ (%) |
|---|---|---|---|---|
| Example 5 | 100 | 97 | 93 | 88 |
| Comparative Example 1 | 100 | 90 | 81 | 62 |
| Example 6 | 100 | 95 | 87 | 72 |

TABLE 2

| Discharge current density retention | 0.1 mA/cm$^2$ (%) | 0.2 mA/cm$^2$ (%) | 0.5 mA/cm$^2$ (%) | 1.0 mA/cm$^2$ (%) |
|---|---|---|---|---|
| Example 5 | 100 | 97 | 93 | 88 |
| Comparative Example 1 | 100 | 90 | 81 | 62 |
| Example 6 | 100 | 95 | 87 | 72 |

As shown in Table 2, the lithium-sulfur cell of Example 5 has a discharge capacity retention that is about twice as high as those of Comparative Example 1 and Example 6. This means that the structure of the electrode including a plasticizer is well maintained even when increasing the discharge current density. Further, the increased capacity results from the increasing of the surface area due to the reduction of pore size.

Figure 5:
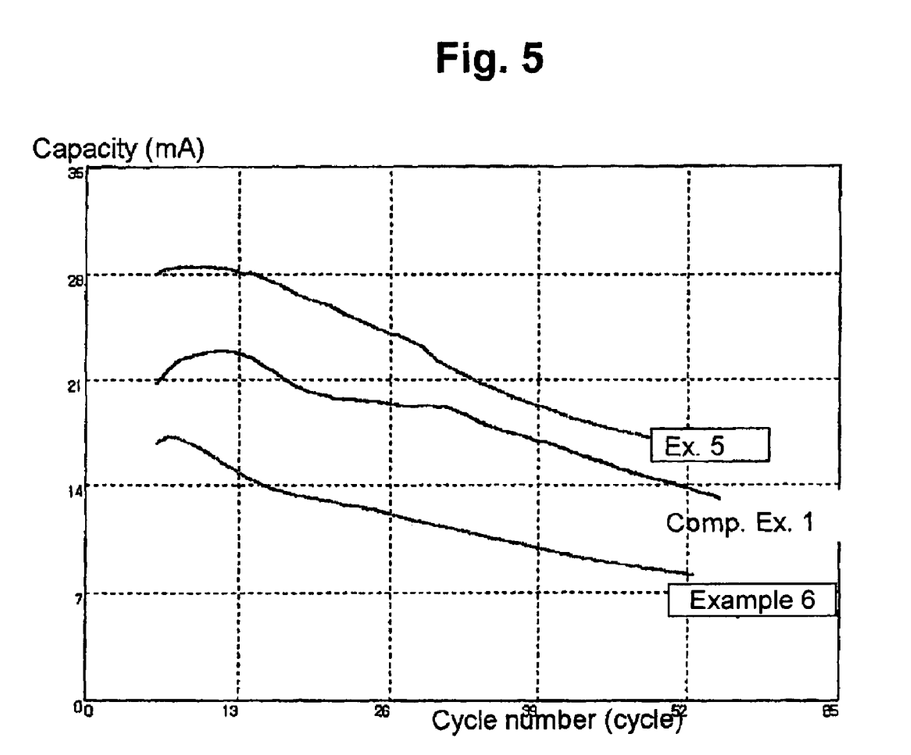
FIG. 5 is a graph showing cycle life characteristics of the lithium-sulfur battery cells according to Example 5, Example 6, and Comparative Example 1.

In addition, FIG. 5 illustrates the cycle life characteristics of cells of Example 5, and Comparative Example 1 and Example 6. Referring FIG. 5, the cycle life of the cell of Example 5 is significantly improved over the cells of Comparative Example 1 and Example 6.

Lithium-sulfur batteries of the present invention, therefore, have good cycle life characteristics and capacity characteristics.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A lithium-sulfur battery comprising:
   a positive electrode having an electron-conductive path and an ion-conductive path and comprising: a positive active material including an active sulfur in the form of solid phase elemental sulfur (S8) and/or a polysulfide solution, and pores of an average size greater than or equal to substantially 5 µm and less than and including 15 µm having both electron-conductive and ion-conductive properties, where the active sulfur is disposed in the pores during an electrochemical reaction of the lithium-sulfur battery;
   a negative electrode comprising a negative active material selected from the group consisting of a lithium metal, a lithium-containing alloy, materials which can reversibly intercalate/deintercalate lithium ions, or materials which can reversibly form a chemical compound with lithium;
   a separator interposed between said positive and negative electrodes; and
   an ion-conductive electrolyte.

2. The lithium-sulfur battery according to claim 1, wherein the average size of the pores is up to 10 µm.

3. The lithium-sulfur battery according to claim 1, wherein the average size of the pores is substantially 5 µm.

4. The lithium-sulfur battery according to claim 1, wherein said positive electrode is prepared by a method comprising:
   mixing an elemental sulfur (S$_8$) powder, a conductive agent, and a binder to provide a positive active material slurry; and
   coating the positive active material slurry on a current collector.

5. The lithium-sulfur battery according to claim 4, wherein an average particle size of the elemental sulfur is greater than 0 µm and is up to 15 µm.

6. The lithium-sulfur battery according to claim 4, wherein an average particle size of the elemental sulfur is greater than 0 µm and is up to 10 µm.

7. The lithium-sulfur battery according to claim 4, wherein an average particle size of the elemental sulfur is greater than 0 μm and is up to 5 μm.

8. The lithium-sulfur battery according to claim 4, wherein the mixing step is performed with a ball mill.

9. The lithium-sulfur battery according to claim 4, wherein, after preparing said positive electrode, a polysulfide solution is added to the lithium-sulfur battery.

10. The lithium-sulfur battery according to claim 1, wherein the ion-conductive properties are supplied using an ionic conductive medium selected from the group consisting of ethylene carbonate, propylene carbonate, dioxolane, sulfolane, xylene, diglyme, tetrahydro furan, tetraglyme, sulfone, dimethyl sulfone, dialkyl carbonate, butyrolactone, N-methyl pyrrolidone, tetramethyl urea, glyme, crown ether, dimethoxy ethane, N,N-diethyl formamide, N,N-diethyl acetamide, hexamethyl phosphoamide, pyridine, dimethyl sulfoxide, N,N-dimethyl acetamide, tributyl phosphate, trimethyl phosphate, N,N,N,N-tetraethyl sulfamide, tetramethylene diamine, tetramethyl propylene diamine, pentamethylene triamine, methanol, ethylene glycol, polyethylene glycol, nitromethane, trifluoro acetic acid, trifluoro methane sulfonic acid, sulfur dioxide, and boron trifluoride, and a mixture thereof.

11. The lithium-sulfur battery according to claim 1, wherein the positive electrode comprises:
a current collector coated with the positive active material and, during an electrochemical reaction of the lithium-sulfur battery, has the pores of the average size greater than 5 μm and up to 15 μm in which the active sulfur is disposed and having both electron-conductive and ion-conductive properties,
wherein the positive electrode has an electron-conductive path and an ion-conductive path.

12. The lithium-sulfur battery according to claim 11, wherein the average size of the pores is greater than 5 μm and is up to 10 μm.

13. The lithium-sulfur battery according to claim 11, wherein the average size of the pores is 5 μm.

14. The lithium-sulfur battery according to claim 11, wherein said positive active material comprises an elemental sulfur ($S_8$) powder, a conductive agent, and a binder coated on said current collector.

15. The lithium-sulfur battery according to claim 14, wherein an average particle size of the elemental sulfur is greater than 0 μm and is up to 20 μm.

16. The lithium-sulfur battery according to claim 14, wherein an average particle size of the elemental sulfur is greater than 0 μm and is up to 10 μm.

17. The lithium-sulfur battery according to claim 14, wherein an average particle size of the elemental sulfur is greater than 0 μm and is up to 5 μm.

18. The lithium-sulfur battery according to claim 14, wherein the binder is selected from the group consisting of poly(vinyl acetate), polyvinyl alcohol, polyethylene oxide, polyvinyl pyrrolidone, alkylated polyethylene oxide, cross linked polyethylene oxide, polyvinyl ether, poly(methyl methacrylate), polyvinylidene fluoride, copolymer of polyhexafluoropropylene and polyvinylidene fluoride, poly(ethyl acrylate), polytetrafluoro ethylene, polyvinyl chloride, polyacrylonitrile, polyvinylpyridine, polystyrene, poly(butyral-co-vinyl alcohol-co-vinyl acetate), poly(methyl metacrylate-co-ethyl acrylate), poly vinyl chloride co-vinyl acetate, polyalkylene oxide, poly(1-vinylpyrrolidone-co-vinyl acetate) and cellulose acetate, and a mixture thereof.

19. The lithium-sulfur battery according to claim 11, wherein the ionic conductive properties are supplied by an ionic conductive medium selected from the group consisting of ethylene carbonate, propylene carbonate, dioxolane, sulfolane, xylene, diglyme, tetrahydro furan, tetraglyme, sulfone, dimethyl sulfone, dialkyl carbonate, butyrolactone, N-methyl pyrrolidone, tetramethyl urea, glyme, crown ether, dimethoxy ethane, N,N-diethyl formamide, N,N-diethyl acetamide, hexamethyl phosphoamide, pyridine, dimethyl sulfoxide, N,N-dimethyl acetamide, tributyl phosphate, trimethyl phosphate, N,N,N,N-tetraethyl sulfamide, tetramethylene diamine, tetramethyl propylene diamine, pentamethylene triamine, methanol, ethylene glycol, polyethylene glycol, nitromethane, trifluoro acetic acid, trifluoro methane sulfonic acid, sulfur dioxide, and boron trifluoride, and a mixture thereof.

20. The lithium-sulfur battery of claim 1, wherein said electrolyte is a solid.

21. The lithium sulfur battery of claim 20, wherein said solid electrolyte comprises one of a glass electrolyte, a polymer electrolyte, a ceramic electrolyte, and a mixture of polymer electrolyte with a supporting electrolyte salt.

22. The lithium-sulfur battery according to claim 1, wherein the positive electrode is prepared by:
coating a composition including a conductive agent, a binder, and a plasticizer onto a current collector;
removing the plasticizer from the composition coated on the current collector with an organic solvent to generate pores in the composition coated on the current collector; and
injecting a polysulfide solution into the generated pores.

23. The lithium-sulfur battery according to claim 22, wherein the composition further comprises elemental sulfur ($S_8$).

24. The lithium-sulfur battery according to claim 22, wherein an amount of the plasticizer is 5 to 80% by weight of said positive electrode.

25. The lithium-sulfur battery according to claim 22, wherein the plasticizer is at least one selected from the group consisting of dibutyl phthalate, dimethyl phthalate, diethyl phthalate, trishutoxyethyl phosphate, propylene carbonate, ethylene carbonate, trimethyl trimellitata, and a mixture thereof.

26. The lithium-sulfur battery according to claim 22, wherein the organic solvent is selected from the group consisting of ether, diethyl ether, hexane, petroleum ether, ligroin, cyclohexane, methanol, ethanol, dichloromethane, trichloroethylene, and trichloroethane, and a mixture thereof.

27. The lithium-sulfur battery according to claim 22, wherein the binder is selected from the group consisting of poly(vinyl acetate), polyvinyl alcohol, polyethylene oxide, polyvinyl pyrrolidone, alkylated polyethylene oxide, cross linked polyethylene oxide, polyvinyl ether, poly(methyl methacrylate), polyvinylidene fluoride, copolymer of polyhexafluoropropylene and polyvinylidene fluoride, poly(ethyl acrylate), polytetrafluoro ethylene, polyvinyl chloride, polyacrylonitrile, polyvinylpyridine, polystyrene, poly(butyral-co-vinyl alcohol-co-vinyl acetate), poly(methyl metacrylate-co-ethyl acrylate), poly vinyl chloride co-vinyl acetate, polyalkylene oxide, poly(1-vinylpyrrolidone-co-vinyl acetate) and cellulose acetate, and a mixture thereof.

28. The lithium-sulfur battery according to claim 22, wherein the current collector is rolled prior to removing the plasticizer.

* * * * *